June 6, 1967   G. A. BRICKER, JR   3,323,699
STRIP CENTERLINE SENSOR AND CONTROL
Filed Oct. 4, 1965   3 Sheets-Sheet 1

INVENTOR.
Gayle A. Bricker Jr.
BY John D. Mesaros
ATTORNEY

# United States Patent Office 3,323,699
Patented June 6, 1967

3,323,699
STRIP CENTERLINE SENSOR AND CONTROL
Gayle A. Bricker, Jr., Sarver, Pa., assignor to Allegheny Ludlum Steel Corporation, Brackenridge, Pa., a corporation of Pennsylvania
Filed Oct. 4, 1965, Ser. No. 492,611
13 Claims. (Cl. 226—15)

This invention relates to centering devices, and more particularly to devices for maintaining and positioning a moving strip of material on a given center line of travel.

In even more particular aspects this invention relates to a device which will maintain and position different widths of moving strip on a given line without the need for separate adjustment of the strip-sensing device for each change in strip width.

In many continuous operations involving the processing of strip material it is necessary that the material be maintained on a given line, conventionally, the center of the strip being maintained on the equipment center line. The equipment for maintaining the strip on a given line includes instrumentation for sensing the edge or edges of the strip, a steering device for correcting any deviation of the strip from the center line, and the appropriate control elements interposed therebetween for correcting the deviation in response to the output of the sensing means.

Systems used in the past have employed photocells, edge-contacting devices, infrared devices, hydraulic sensors and other similar mechanical, hydraulic and/or electrical variations. However, problems have been inherent with some of these devices when subjected to adverse environmental factors such as dust, heat, humidity and vibration.

Accordingly, it is an object of this invention to provide a new and improved system for maintaining and positioning a moving strip of material on a given line of travel.

It is another object of this invention to provide a new and improved non-contacting edge-sensing device which is immune to adverse environmental conditions.

It is still another object of this invention to provide a new and improved edge-sensing device which utilizes the characteristics of the strip of moving material to provide an indication proportional to the deviation of the center line of the strip from the center line of the equipment.

It is a further object of this invention to provide a new and improved edge-sensing device which has no moving parts and which forms part of an electrical circuit for deviation measurement and correction.

The foregoing objects are accomplished in this invention by providing at least one conductive detector plate, when used with a conductive strip of material, the plate being disposed in a spaced parallel relationship with the strip of material in partially overlapping relation therewith. The strip of material acts as the second plate of a capacitive element, whose capacitance is determined by the area of the detector plate in the overlapping area. As the strip of material traverses laterally during its deviation from the desired center line, the capacitance varies due to the variation in the overlapping area of the detector plate. This capacitive element is connected to an inductive circuit to provide a parallel capacitive-inductive circuit tuned near resonance. The output of this circuit is fed into the control windings of a pair of bistable magnetic amplifiers which control a hydraulic system providing the necessary corrective action to the strip of material by means of a steering roll. The steering roll action is sensed by an appropriate feedback element which supplies energy to a second set of control windings in the bistable magnetic amplifiers, this feedback energy counteracting the capacitive-inductance circuit output energy to thereby minimize hunting.

Another embodiment utilizes a pair of edge-sensing elements disposed laterally on either side of the strip material, and encompasses a pair of parallel capacitive-inductance tuned circuits so coupled as to produce a differential output proportional to the deviation of the strip from the desired center line. The edge-sensing elements are symmetrically disposed with respect to the desired center line, and the phase relations of the circuits are so arranged that the correct positioning of the strip will provide a zero output. This embodiment provides more accurate positioning of the strip, inasmuch as both edges are sensed and the outputs of the edge-sensing elements oppose each other to provide a differential output. Furthermore, varying widths of material run on the same line will not require adjustment of the edge-sensing elements, provided the detector plate are of sufficient length to confine the lateral movement of the strip within the length of the plate.

Further objects, features and advantages of the invention will become apparent from the following description when taken in conjunction with the accompanying drawings, in which.

Figure 1:
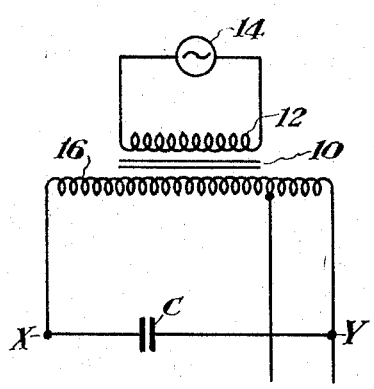
FIGURE 1 is a schematic diagram of the basic circuit utilized in this invention.
Figure 3:
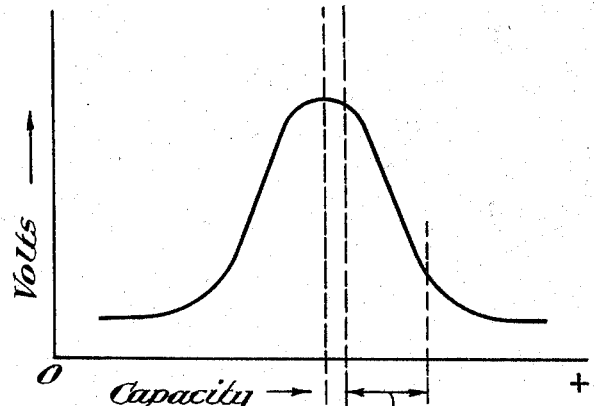
FIG. 3 is a typical resonant curve for the circuits of FIGS. 1 and 2 showing a representative operating range.

Referring now to the drawings, in FIG. 1 there is shown a basic circuit utilizing the principle of variation of capacitive reactance in a parallel capacitive-inductive circuit tuned near resonance. A transformer 10 has its primary 12 connected to a suitable source 14 of alternating current. The secondary 16 is excited by the primary 12 and exhibits a certain inductive reactance and internal impedance. Capacitor C is connected across the secondary 16, and when it is adjusted to the point where its capacitive reactance is equal to the inductive reactance, the situation called resonance exists and the voltage across the secondary terminals, designated X and Y, is at a maximum. This corresponds to line A on the resonance curve (FIG. 3). As the capacity of capacitor C is increased, the capacitive reactance decreases, and therefore its impedance lowers. This then loads the power source which is reflected to the secondary 16 of the transformer 10, and the voltage across X and Y decreases. The secondary 16 is tapped at M so that a low impedance output may be taken across a portion of the secondary coil 16 between the terminals designated Y and M, thus not loading the relatively high impedance existing between the terminals X and Y of the secondary 16.

As will hereinafter become more obvious, in this invention it is desirable that the secondary or tuned section of the transformer 12 should not be loaded. Any extra loading on a tuned circuit broadens the resonance point, reducing the amplitude of the voltage appearing across the circuit. Therefore it would take a larger change in capacitance of the capacitor C to provide a usable output signal. Consequently the sensitivity of the tuned circuit is greatly increased by not loading the secondary, and minute changes in the capacitance will result in detectable changes in the output signal.

Figure 2:
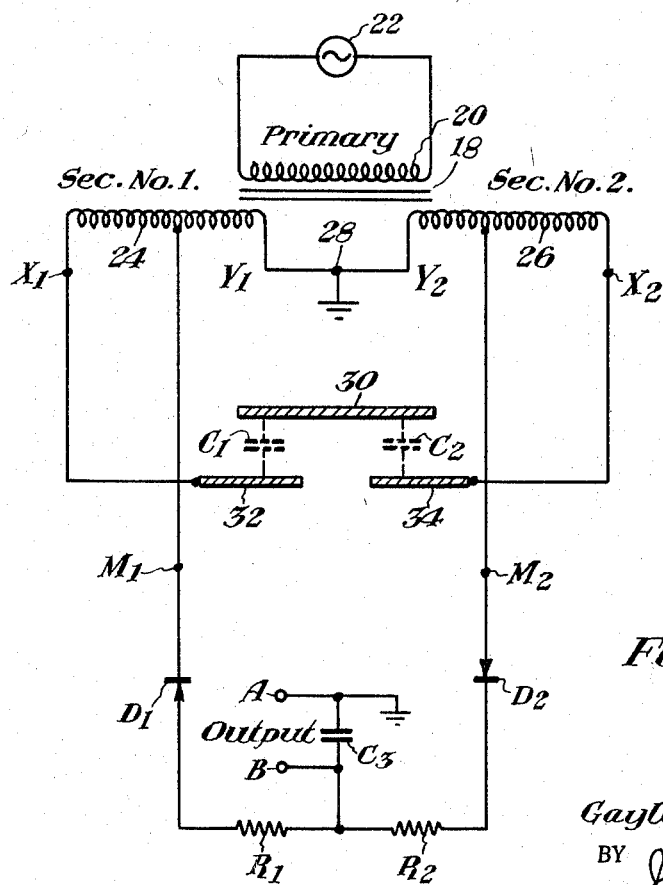
FIG. 2 is a schematic diagram of a modification of the circuit of FIG. 1 as applied to this invention.

FIG. 2 illustrates a modification of the basic circuit of FIG. 1 wherein a transformer 18 has two secondary coils 24 and 26, respectively. Two substantially identical secondary circuits are established to thereby permit a differential output proportional to the deviation of the strip of moving material from the desired center line. As can be seen, the primary 20 of the transformer 18 is excited by a suitable source 22 of alternation current. For illustrative purposes, each individual secondary circuit has its respective components designated with the subscripts "1" or "2." The terminals for the first secondary winding 24 are designated $X_1$ and $Y_1$, and correspondingly, for the second secondary winding 26, $X_2$ and $Y_2$. The secondary terminals $Y_1$ and $Y_2$ are connected together at point 28 and suitably grounded. The other terminals $X_1$ and $X_2$ are respectively connected to conductive detector plates 32 and 34 which hereinafter will be more fully discussed. The conductive detector plates 32 and 34 are symetrically disposed with respect to the desired center line of travel of the conductive strip 30. The conductive detector plates 32 and 34 are generally identical in size, shape and configuration, and are positioned generally parallel and in close relation to the plane of travel of the conductive strip 30 of moving material. The detector plates are positioned adjacent opposite edges of the strip 30. The conductive strip 30 is suitably grounded, which grounding is usually accomplished through the rolls of the machinery itself. As now becomes obvious, the conductive strip 30 serves as a second plate of a capacitor existing between the detector plates 32 and 34 and the strip itself. The capacitance between the strip and the plates is indicated in dotted lines and designated, respectively, $C_1$ and $C_2$.

Inasmuch as the capacitance of a given capacitor is directly related to the area of the detector plate covered by the strip, and inversely proportional to the distance between the detector plate and the conductive strip, by keeping the distance fairly constant the capacitance will be directly proportional to the area of the detector plate covered by the strip. As the moving conductive strip 30 varies laterally, the relative capacitance of the capacitors $C_1$ and $C_2$ will vary with respect to one another. The detector plates 32 and 34 are positioned so that the capacitance of capacitors $C_1$ and $C_2$ will be substantially equal when the conductive strip 30 is following the desired center line. Secondary terminals $M_1$ and $M_2$, respectively, are provided for the secondary windings 24 and 26 to allow for an output signal between $M_1$ and ground similarly between $M_2$ and ground. There is in series relation with terminal $M_1$ of secondary winding 24 a diode $D_1$, a resistor $R_1$ and a capacitor $C_3$ to ground, which ground is essentially at the same potential as the conductive strip 30. Similarly, with terminal $M_2$ of secondary winding 26 there is in series therewith a diode $D_2$ and a resistor $R_2$, the other terminal thereof being connected between resistor $R_1$ and capacitor $C_3$. A signal is then taken across capacitor $C_3$ by means of the output terminals A and B, as will be discussed hereinafter.

The alternating current from the respective parallel capacitive-inductive circuits is rectified by the respective diodes $D_1$ and $D_2$, and the current is limited by the current-limiting resistors $R_1$ and $R_2$, respectively. At output terminal B, where the resistors $R_1$ and $R_2$ are electrically connected, there is a summing of the half-wave rectified voltages, the net result being a differential voltage due to the polarities of the diodes $D_1$ and $D_2$ which are arranged in opposing relation. As can be seen, the capacitor $C_3$ acts as a smoothing capacitor to filter the resultant differential output to provide a substantial D.C. voltage. The other output terminal A is connected to the other end of capacitor $C_3$ and subsequently to ground. Consequently the voltage across output terminals A and B can be either positive or negative and of a magnitude indicative of the strip deviation.

Thus it can be seen that the above-described circuit provides a voltage differential detector, the output signal being taken across capacitor $C_3$. The voltage differential detector is so arranged that if the alternating current voltages between $M_1$ and ground and $M_2$ and ground are equal, no direct current voltage appears across the capacitor $C_3$ and the secondary circuitry is consequently at a zero voltage output balance point. If these alternating current voltages are different, a D.C. voltage appears across the capacitor $C_3$, and this direct current voltage is of such a polarity to indicate in which direction the strip center line is in error, and has a magnitude that approximates the amplitude of the error.

Figure 4:
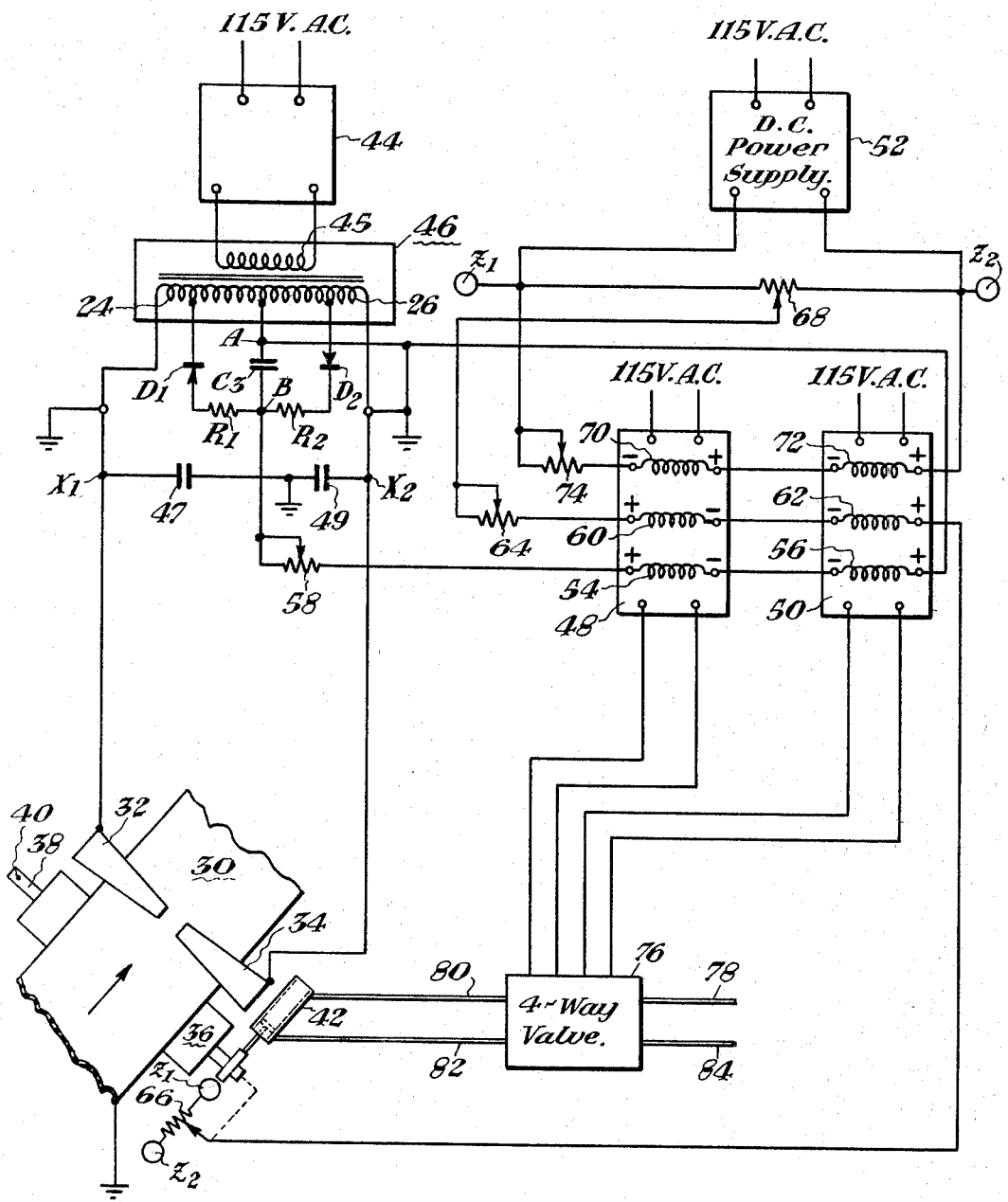
FIG. 4 is a partially schematic and partially diagrammatic representation of an illustrative embodiment of the edge-sensing and strip center control circuit according to the invention.

Referring now to FIG. 4, there is shown a complete system utilizing the circuit of FIG. 2. A conductive strip 30 of moving material is passing over and in contact with a steering roll 36 having an axis 38 which, at one end thereof, has a steering roll pivot point 40. Changing the direction of the strip of moving material is accomplished by rotating the steering roll 36 about the steering roll pivot point 40. This movement is accomplished by means of a bidirectional hydraulic cylinder 42 which is mechanically coupled to the free end of the axis 38. The actuating movement of steering roll 36 will be discussed in detail hereinafter. In close proximity with, and parallel to, the conductive strip 30 of moving material there are positioned, symmetrically about the desired center line, two generally trapezoidally shaped conductive detector plates 32 and 34. As hereinbefore discussed, these detector plates 32 and 34 each form one plate of a capacitor, the other plate being the conductive strip 30 which is suitably grounded through the machinery itself. The electrical circuitry comprises an alternating current source 44, a radio frequency transformer 46, a pair of magnetic amplifiers 48 and 50, a direct current power supply 52, and a suitable hydraulic system actuated in response to the strip deviation. Specifically, the alternating current source 44 is a 250-kc. oscillator providing the necessary excitation to the primary 45 of the transformer 46. The secondary circuitry is identical to the circuit of FIG. 2 and the parts thereof are similarly marked so no further discussion is deemed necessary. Two trimming capacitors 47 and 49 have been added to this circuitry and each is in parallel with the capacitor formed by the detector plates 32 and 34, respectively. Care must be taken to minimize or account for the capacitance of the leads between $X_1$ and $X_2$ and the detector plates 32 and 34 respectively. The trimming capacitors 47 and 49 are utilized to establish an initial operating point on the resonance curve of FIG. 3 in the absence of the conductive strip 30. The introduction of strip 30 will alter the operating point to some position within the designated operating range (indicated by the lines B and C) which, as can be seen from the curve of FIG. 3, is a portion of the curve which is substantially linear. By utilizing this portion of the curve, control is simplified inasmuch as the output of the voltage differential detector would be a relatively linear function of the deviation of the strip from the given center line.

The output of the voltage differential detector is taken across the capacitor $C_3$ at points designated A and B, and fed into the series-connected control winding 54 and 56 of magnetic amplifiers 48 and 50, respectively. For the purpose of simplicity, only the control windings are illustrated in the magnetic amplifiers 48 and 50, and the relative polarity of connection is designated by either a plus (+) or minus (−). The magnetic amplifiers 48 and 50 are bistable units having either an "on" or "off" condition. The control windings 54 and 56 are connected in opposing relation (as shown by polarity designations) to establish an "on" position for only one of the magnetic amplifiers at any one time. This would, in effect, correspond to one magnetic amplifier 48, for example, being responsible for movement of the steering roll 36 in a given direction, while the other magnetic amplifier 50 would dictate movement of the steering roll 36 in the other direction.

In series with the voltage differential detector output and opposing control windings 54 and 56 is a sensitivity control or potentiometer 48, the resistance of which can be varied to limit the amount of current to the control windings. The control windwings 54 and 56 are connected in opposing relation so that one will respond to a positive signal, the other a negative signal.

To close the control loop of a second pair of opposing control windings 60 and 62 of magnetic amplifiers 48 and 50, respectively, are connected in series with a feedback calibration control potentiometer 64 and coupled across a direct current bridge, formed by strip roll position potentiometer 66 and feedback null set potentiometer 68. The bridge is powered by a suitable source 52 of direct current. Strip roll potentiometer 66 is connected across the D.C. source 52 at terminals designated $Z_1$ and $Z_2$. The feedback null set potentiometer 68 is similarly so connected in parallel with strip roll potentiometer 66. The sliding tap on steering roll position potentiometer 66 is mechanically coupled to the movable end of the axis 38 of steering roll 36. The sliding taps of potentiometers 66 and 68 are connected in series with the feedback calibration control potentiometer 64 and the control windings 60 and 62 of magnetic amplifiers 48 and 50, respectively. The center tap of potentimeter 68 is adjusted for zero current through the control windings 60 and 62 with the center tap of strip roll potentiometer 66 preset for a center position of strip roll 36. Thus the direction of the unbalance current in the control windings 60 and 62 would be indicative of the direction of movement of the steering roll 36 and the amplitude of the current would be indicative of the amount the steering roll 36 has moved. This signal from the steering roll 36 through the steering roll position potentiometer 66 is phased to oppose the voltage differential detector signal and is calibrated so that the steering roll 36 movement is just enough to correct the tracking error.

A third pair of control windings 70 and 72 in the magnetic amplifiers 48 and 50, respectively, may be used in conjunction with a biased sensitivity control rheostat 74 to the direct current source 52 for the purpose of establishing an initial bias point in the "off" direction for the magnetic amplifiers, thus insuring that magnetic amplifiers 48 and 50 turn "off" with a composite zero signal considering all used control windings, or the control windings 70 and 72 may be used to set in a dead band, which may be desirable in some applications. The power supply to the magnetic amplifiers is provided by a suitable alternating current source which is indicated as being 115 volts alternating current. The specific magnetic amplifiers used in this embodiment have a silicon-controlled rectifier output of sufficient energy level to energize the solenoids of a 4-way spring return closed-center hydraulic valve 76 which directs oil from supply line 78 to appropriate cylinder lines, either 80 or 82 to hydraulic cylinder 42, back through the other cylinder line to hydraulic valve 76 and the oil return line 84. If neither magnetic amplifier is "on" all oil lines are closed and the hydraulic cylinder 42 is therefore locked in position. The hydraulic cylinder 42 provides steering action to the steering roll 36 about the pivot point 40. Thus it can be seen that this system provides a means for sensing the deviation of the strip 30 and controlling the direction of the strip 30 in the proper direction in a minimum amount of time.

During initial setup of this system, the detector plates 32 and 34 are first manually positioned with respect to the center line of the equipment, and fine adjustment is made by adjusting the circuit elements with the steering roll position feedback potentiometer tap at its center position. To facilitate initial setup maintenance or trouble shooting a double pole switch 61 (as shown in FIG. 4) can be added to open the "off" bias winding and negative feedback winding circuits allowing for quick checking and adjustment of the prime detecting circuit.

It is to be understood however, that the particular edge-sensing device could be utilized to follow one edge or both, and in any event could be incorporated as a capacitive element into any suitable electrical circuit which would have as a characteristic, an output proportional to the capacitance of the overlapping area of the detector plate or plates of the edge-sensing device. The embodiments shown and described herein are intended to be illustrative only, and not limiting.

Figure 5:
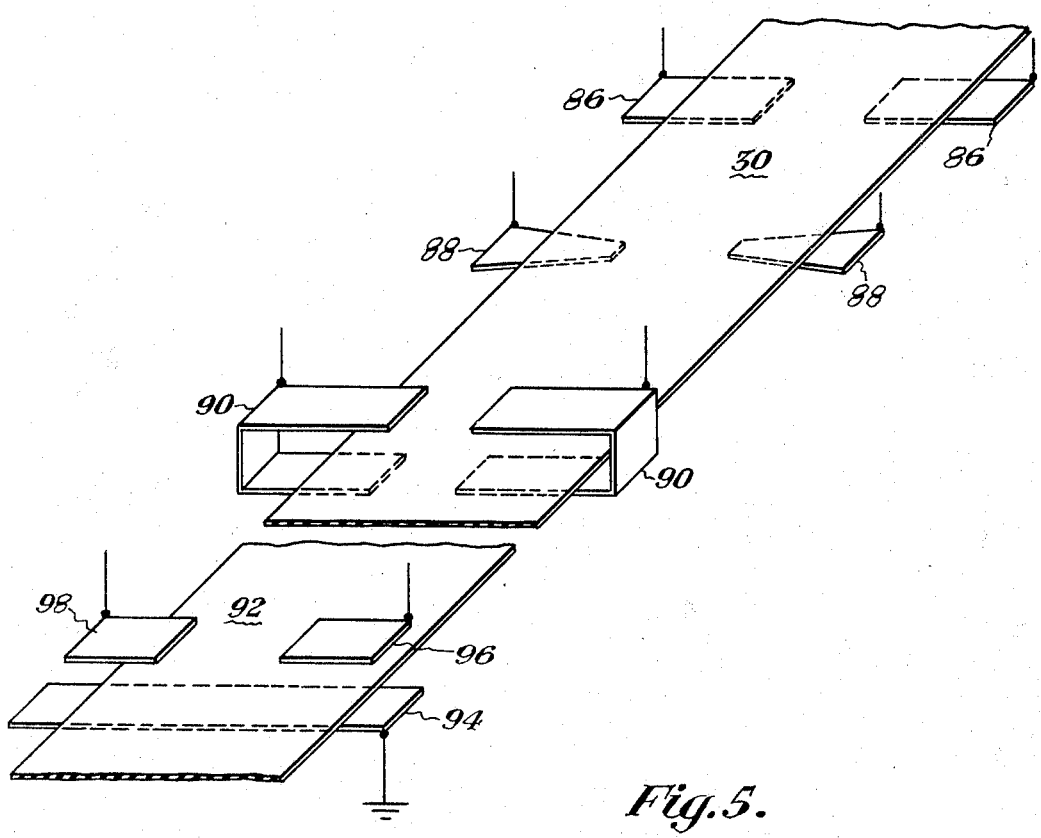
FIG. 5 shows several modifications of the edge-sensing device for compensation according to the quality of dielectric nature of the strip of moving material.

There is shown in FIG. 5 a series of different shapes for edge-sensing devices which may be applied to the detector plates 32 and 34, depending upon various factors such as irregular edges, a fluctuating movement of the conductive strip, or dielectric nature of the material. For example, the detector plates 86 are substantially rectangular in configuration and are placed generally symmetrical with respect to the center line of travel in a spaced parallel relationship to the conductive strip 30. For providing high sensitivity on wide material, the configuration can be shaped, as indicated, by detector plates 88, which are generally trapezoidal in shape. The trapezoidal shape would result in a much larger increase in capacitance for a given unit of lateral movement of the conductive strip 30, which increase in capacitance would occur on the detector plate 88 in the direction of lateral movement. Consequently, there would be a greater unbalance resulting in higher sensititivity. In many instances the conductive strip 30 may possess wavy edges, which would result in a fluctuating distance between the detector plate and the conductive strip 30. In order to offset the fluctuations in capacitance, the plates may take the shape of detector plates 90, which are generally U-shaped with one leg of the U disposed parallel to and beneath the conductive strip 30, the other leg of the U disposed parallel to and above the strip 30. This would result in the capacitance between the strip 30 and the upper leg varying inversely to and counteracting the capacitance between the conductive strip 30 and the lower leg. The net result would be balancing out the variations in capacitance and resulting in an average value.

Inasmuch as the capacitance of a capacitor is also directly proportional to the relative dielectric constant of the media interposed between the plates, this invention could also be used for edge-sensing of dielectric materials. A method for accomplishing this is shown in FIG. 5 wherein the dielectric material 92 passes over a common conductive plate 94 and a pair of edge-sensing detector plates 96 and 98. In this particular application, the plate 94 would become an integral of the circuit heretofore described. As the dielectric strip 92 moves laterally between the plates, the capacitance would increase on one plate and decrease on the other plate according to the direction of movement. This differential signal would provide the desired output for control of the appropriate circuitry to provide the necessary corrective steering action for the strip.

While there have been shown and described specific embodiments, other adaptations and modifications may be made without departing from the spirit and scope of the invention.

I claim:

1. In a system for sensing the edge of a moving strip of material with regard to a given reference point, the improvement comprising,
    (a) a conductive detector member having a segment thereof disposed in spaced parallel relation to the plane of movement of the strip material adjacent one edge thereof, said segment having an area in a continually overlapping relationship with said strip, said member and said strip cooperating to form a portion of a capacitive element which is characterized by a capacitance proportional to the overlapping area; and
    (b) electrically energized circuit means connected to said capacitive element, the output of which varies in proportion to the capacitance of the capacitive element whereby the output of said circuit means produces an indication of the deviation of said moving strip from a given reference point.

2. In a system for maintaining a moving strip of conductive material on a given center line of travel, which system includes steering means to change the position of the strip with respect to the given center line of travel, the improvement which comprises:

(a) at least one conductive detector plate positioned adjacent one edge of the strip, said plate having a portion thereof spaced from and generally parallel to the strip of moving material, said plate having an area in a continually overlapping relationship with said strip, said plate and said strip forming a capacitive element, the capacitance of which is proportional to the overlapping area;

(b) electrically energized circuit means having an output and a balance point indicative of the desired position of the strip, said capacitive element being electrically connected to said circuit means, the output of said circuit means varying in proportion to the capacitance of the capacitive element; and (c) means to operate the steering means in response to the output of said circuit means, said operating means including other means responsive to the operation of said steering means, said other means being electrically connected to said circuit to bias said means to operate the steering means in a direction to return said circuit means to the balance point.

3. In a system for sensing the edge of a moving strip of conductive material, the improvement which comprises:

(a) a first and a second conductive detector plate positioned adjacent opposite edges of said strip, said plates being spaced from and generally parallel to the strip of moving material, each of said plates having an area continually overlapping relationship with its respective edge of said strip, each of said plates and said strip forming a capacitive element having its capacitance proportional to the overlapping area; and (b) electrically energized circuit means, each of said capacitive elements being electrically connected to said circuit means, said circuit means having said capacitive elements connected in such a manner to provide an output proportional to the difference between the capacitances of said capacitive elements, whereby the correct positioning of the strip provides a zero output from said circuit means.

4. In a system for maintaining a moving strip of conductive material on a given center line of travel, which system includes steering means to change the position of the strip with respect to the given center line of travel, the improvement which comprises:

(a) a first and a second tuned circuit means, each of said tuned circuit means having a variable capacitive element for shifting the output of said circuit means along the curve of its operating characteristics;

(b) a first and a second conductive detector plate positioned on opposite sides o fthe center line, each of said plates having a portion thereof spaced from and generally parallel to the strip of moving material, each of said plates having an area in a continually overlapping relationship with its respective edge of said strip, each of said plates and said strip forming said capacitive element having its capacitance proportional to the overlapping area;

(c) means for electrically connecting the outputs of said first and said second tuned circuit means in opposing relation to provide a differential output indicative of the magnitude and direction of unbalance;

(d) switching means operative in response to the direction and magnitude of said differential output; and (e) actuating means coupled to the steering means, said actuating means being controlled by said switching means to operate said steering means to thereby steer said strip back to the given center line of travel.

5. In a system for maintaining a moving strip of conductive material on a given center line of travel, which system includes steering means to change the position of the strip with respect to the given center line of travel, the improvement which comprises:

(a) a first and a second tuned circuit means, each of said tuned means having a variable capacitive element for shifting the output of said circuit means along the curve of its operating characteristics;

(b) a first and a second conductive detector plate positioned on opposite sides of the center line, each of said plates having a portion thereof spaced from and generally parallel to the strip of moving material, each of said plates having an area in a continually overlapping relationship with its respective edge of said strip each of said plates and said strip forming said capacitive element having its capacitance proportional to the overlapping area;

(c) means for electrically connecting the outputs of said first and second tuned circuit means in opposing relation to provide a differential output indicative of the magnitude and direction of unbalance;

(d) switching means operative in response to the direction and magnitude of said differenital output;

(e) actuating means coupled to the steering means, said actuating means being controlled by said switching means to operate said steering means to thereby steer said strip back to the given center line of travel; and (f) means for sensing the movement of said steering means, the output of said sensing means being electrically connected to said switching means and in opposing relation thereto to dampen the response of said switching means.

6. In a system for maintaining a moving strip of conductive material on a given center line of travel, which system includes steering means to change the position of the strip with respect to the given center line of travel, the improvement which comprises:

(a) a first and a second tuned circuit means, each of said tuned means having a variable capacitive element for shifting the output of said circuit means along the curve of its operating characteristics;

(b) a first and a second conductive detector plate positioned on opposite sides of the center line, each of said plates having a portion thereof spaced from and generally parallel to the strip of moving material, each of said plates having an area in a continually overlapping relationship with its respective edge of said strip, each of said plates and said strip forming a capacitive element having its capacitance proportional to the overlapping area;

(c) means for electrically connecting the outputs of said first and said second tuned circuit means in opposing relation to provide a rectified differential output indicative of the unbalance between the outputs of said first and said second tuned circuits;

(d) a first and a second polarity sensitive switching means, said switching means being alternately operative depending on the polarity of the output of the unbalance of said differential output; and (e) means bidirectionally operated by the output of said switching means, said bidirectional means actuating said steering means in a direction to reduce said differential output to zero.

7. In a system for maintaining a moving strip of material having dielectric properties on a given center line, which system includes steering means to change the position of the strip with respect to the given center line, the improvement which comprises:

(a) a first and a second conductive detector plate positioned in spaced parallel relation, and disposed for passage of the strip of material between at least a portion of said detector plates in a continually overlapping relationship, said detector plates forming a capacitive element, the capacitance of which is proportional to the area of the material between said detector plates;

(b) electrically energized circuit means having an output and a strip center control balance point, said capacitive element being electrically connected to said circuit means, the output of said circuit means varying in proportion to the capacitance of the capacitive element; and (c) means to operate the steering means in response to the output of said circuit means, the operation of said steering means being in a direction to return said circuit means to the strip center control balance point.

8. In a system for sensing the edge of a moving strip of conductive material, the improvement which comprises:

(a) at least one conductive detector plate positioned adjacent one edge of the strip, said plate being spaced from and generally parallel to the strip of moving material, said plate having an area in a continually overlapping relationship with said strip, said plate and said strip forming a capacitive element, the capacitance of which is proportional to the overlapping area; and (b) electrically energized circuit means, said capacitive element being electrically connected to said circuit means, the output of said circuit means varying in proportion to the capacitance of the capacitive element, whereby the output of said circuit means gives an indication of the deviation of said moving strip.

9. In a system for sensing the edges of a moving strip of dielectric material, the improvement which comprises:

(a) a first and a second conductive detector plate positioned in spaced parallel relationship adjacent one edge of the strip, said plates being positioned for passage of said strip therebetween, said plates having an area in a continually overlapping relationship with said strip, said first and said second conductive detector plates forming a capacitive element, the capacitance of which is proportional to the area of said strip between said first and said second plates; and (b) electrically energized circuit means, said capacitive element being electrically connected to said circuit means, the output of said circuit means varying in proportion to the capacitance of the capacitive element, whereby the output of said circuit means gives an indication of the deviation of said moving strip.

10. In a system for maintaining a moving strip of dielectric material on a given center line of travel, which system includes steering means to change the position of the strip with respect to the given center line of travel, the improvement which comprises:

(a) a first and a second pair of conductive detector plates positioned on opposite sides of the center line adjacent the edges of the strip, each of said pairs having its plates positioned in spaced parallel relationship and adapted for passage of said strip therebetween in a continually overlapping relationship, each of said pairs of plates forming a capacitive element having its capacitance proportional to the area of said strip between each pair of said plates;

(b) a first and a second tuned circuit means, each of said tuned circuit means having electrically connected thereto one of said capacitive elements;

(c) means for electrically connecting the outputs of said first and said second tuned circuit means in opposite relation to provide a differential output indicative of the magnitude and direction of unbalance;

(d) switching means operative in response to the direction and magnitude of said differential output; and (e) actuating means coupled to the steering means, said actuating means being controlled by said switching means to operate said steering means to thereby steer said strip back to the given center line of travel.

11. In a system for maintaining a moving strip of dielectric material on a given center line of travel, which system includes steering means to change the position of the strip with respect to the given center line of travel, the improvement which comprises:

(a) a first and a second pair of conductive detector plates positioned on opposite sides of the center line adjacent the edges of the strip, each of said pairs having its plates positioned in spaced parallel relationship and adapted for passage of said strip therebetween in a continually overlapping relationship, each of said pairs of plates forming a capacitive element having its capacitance proportional to the area of said strip between each pair of said plates;

(b) a first and a second tuned circuit means, each of said tuned circuit means having electrically connected thereto one of said capacitive elements;

(c) means for electrically connecting the outputs of said first and said second turned circuit means in opposite relation to provide a differential output indicative of the magnitude and direction of unbalance;

(d) switching means operative in response to the direction and magnitude of said differential output;

(e) actuating means coupled to the steering means, said actuating means being controlled by said switching means to operate said steering means to thereby steer said strip back to the given center line of travel; and (f) means for sensing the movement of said steering means, the output of said sensing means being electrically connected to said switching means and in opposing relation thereto to dampen the response of said switching means.

12. In a system for maintaining a moving strip of dielectric material on a given center line of travel, which system includes steering means to change the position of the strip with respect to the given center line of travel, the improvement which comprises:

(a) a first and a second pair of conductive detector plates positioned on opposite sides of the center line adjacent the edges of the strip, each of said pairs having its plates positioned in spaced parallel relationship and adapted for passage of said strip therebetween in a continually overlapping relationship, each of said pairs of plates forming a capacitive element having its capacitance proportional to the area of said strip between each pair of said plates;

(b) a first and a second tuned circuit means, each of said tuned circuit means having electrically connected thereto one of said capacitive elements;

(c) means for electrically connecting the outputs of said first and said second tuned circuit means in opposing relation to provide a rectified differential output indicative of the unbalance between the outputs of said first and said second tuned circuits;

(d) a first and a second polarity sensitive switching means, said switching means being alternately operative depending on the polarity of the output of the unbalance of said differential output; and (e) means bidirectionally operative by the output of said switching means, said bidirectional means actuating said steering means in a direction to reduce said differential output to zero.

13. In a system for maintaining a moving strip of dielectric material on a given center line of travel, which system includes steering means to change the position of the strip with respect to the given center line of travel, the improvement which comprises:

(a) a first and a second pair of conductive detector plates positioned on opposite sides of the center line adjacent the edges of the strip, each of said pairs having its plates positioned in spaced parallel relationship and adapted for passage of said strip therebetween in a continually overlapping relationship, each of said pairs of plates forming a capacitive element having its capacitance proportional to the area of said strip between each pair of said plates; and (b) electrically energized circuit means, each of said capacitive elements being electrically connected to said circuit means, said circuit means having said capacitive elements connected in such a manner to provide an output proportional to the difference between the capacitances of said capacitive element, whereby the correct positioning of the strip provides a zero output from said circuit means.

References Cited

UNITED STATES PATENTS

| 2,512,372 | 6/1950 | Pakala | 318—306 |
| 2,777,069 | 1/1957 | Saeman | 226—21 X |
| 2,877,397 | 3/1959 | Poschner et al. | 226—45 X |
| 3,156,397 | 11/1964 | Davies | 318—6 X |

M. HENSON WOOD, JR., *Primary Examiner.*

J. N. ERLICH, *Assistant Examiner.*